E. SHEFFIELD & G. R. BARNES.
Bee Hive.
No. 229,192.   Patented June 22, 1880.
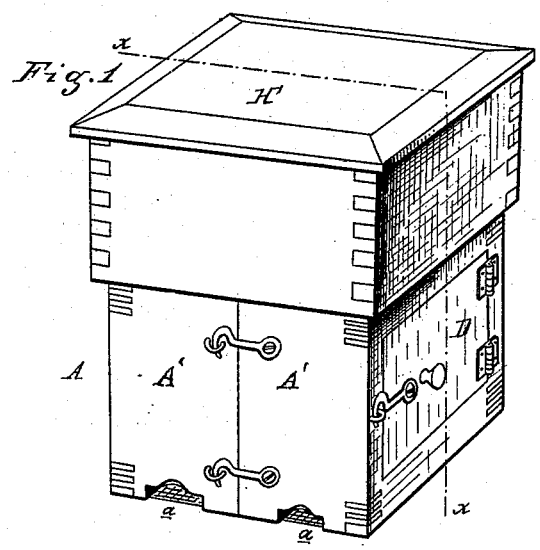
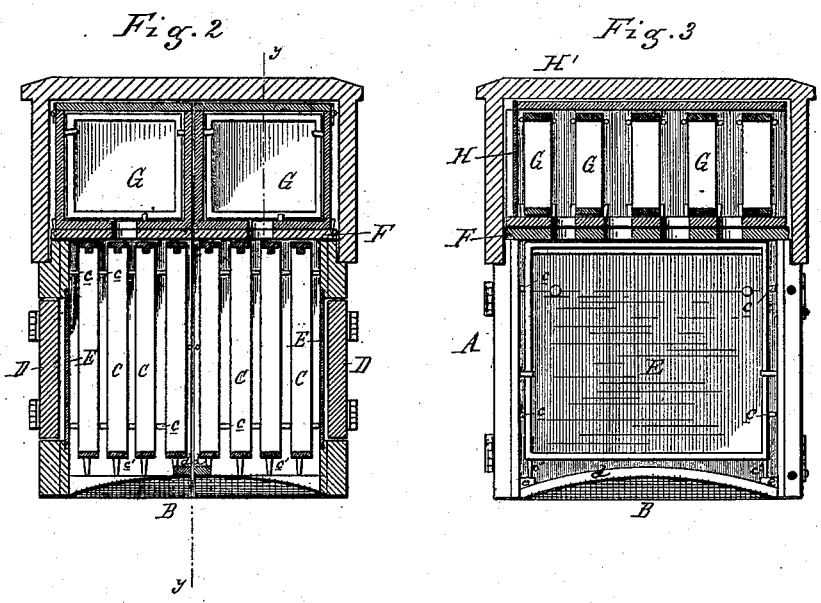
Attest:
A. Barthel
Charles J. Hunt
Inventor:
Ezra Sheffield
George R. Barnes
By atty
Thos. S. Sprague

UNITED STATES PATENT OFFICE.

EZRA SHEFFIELD AND GEORGE R. BARNES, OF BOAZ, WISCONSIN.

BEE-HIVE.

SPECIFICATION forming part of Letters Patent No. 229,192, dated June 22, 1880.

Application filed January 8, 1880.

*To all whom it may concern:*

Be it known that we, EZRA SHEFFIELD and GEORGE R. BARNES, of Boaz, Richland county, Wisconsin, have invented an Improvement in Bee-Hives, of which the following is a specification.

Our invention relates to improvements in that class of bee-hives constructed of sections hinged together at one side, in which the sections are liable to be injured or broken from the frequent jars they are subjected to in closing them. To remedy this defect is the main object of our invention, while at the same time minor advantages are secured by the construction we employ; and to these ends our invention consists in providing the lower inner end of each section with an arched piece springing from the opposite faces of the section, so that when the sections are closed the arched pieces will abut against each other lengthwise and receive the jar or shock arising from closing the sections and materially strengthen them, while at the same time the arched pieces are used to support a wire-screen bottom for the bee-passages and cleats supporting the honey-frames, and a continuous passage is formed for the bees, with an arched bottom, down which dirt or other objects too large to pass through the screen would roll toward the edge or out of the hive, thus materially aiding the bees in keeping them clean, as will be hereinafter more fully set forth.

In the accompanying drawings, Figure 1 is a perspective view. Fig. 2 is a cross-section on line $x\ x$. Fig. 3 is a similar view on line $y\ y$ in Fig. 2.

In the drawings which form a part of this specification, A represents the body of the hive, which is constructed in two sections, A', hinged together at one side, and secured in its closed position by proper hooks, as shown. $d\ d$ represent curved or arched pieces springing from the opposite faces of each section A' of the hive near their lower ends and on the inner sides of each section, so that when the sections are closed the arched pieces $d\ d$ will lie in contact with each other their entire lengths. The arched pieces $d$ are each secured to cleats $e$, attached to the inner opposite faces of each section near their lower ends. The bottom or floor of each section is formed of fine wire-cloth B, which is attached to the lower face of one of the arched pieces $d$ and to the opposite edge of the section, and to the cleats $e$. $a$ are the bee-openings, made in the lower ends of the sections immediately over the wire-cloth B. The arched form of the wire-cloth allows the bees to be brought in closer proximity to the openings between the honey-frames, and at the same time gives a greater space for the admission of air to the wire-cloth. The arched pieces $d$ of each section will lie in contact with each other during their entire length when the sections are closed, and there will then be a continuous passage for the bees under the honey-frames in both sections, and a continuous floor composed of wire-gauze.

The frames C are provided with pins $c$, so as to separate them, and also to keep them from coming in contact with the walls of the hive, which prevent the bees from "waxing" the frames fast. The frames are also provided on each end of their lower faces with pins $c'$, which rest on the cleats $e$, thus forming a passage for the bees between the wire-gauze and the lower faces of the honey-frames. The cleats $e$ thus act as supports for the pins $c'$ of the honey-frames, and serve to support the arched pieces $d$, and the opposite ends of the wire-gauze B are also secured to them.

Each section of the hive is provided with a door, D, which can be opened, so that the condition of the hive may be ascertained, each of such sides being closed by a plate of glass, E.

F are the honey-boards, which rest upon the tops of the frames C, and have suitable holes cut in them to allow the bees to pass into the honey-boxes G, which are placed over them. These boxes may be provided with frames, if desired. In one end of each box is placed a glass, H, through which their condition may be ascertained by removing the cap H' which sets over them.

By this construction of the hive we are enabled to ascertain at all times the condition of the hive without disturbing the bees in their working, and we can separate a swarm, if necessary, or in case of a weak swarm we can shut off one-half or more of the hive, compelling the bees to work within a space suitable to their strength.

What we claim as our invention is—

A bee-hive constructed in sections A', hinged together at one side, and provided with the arched pieces $d$, crowning wire-cloth B, extending continuously over the bottom of both sections when closed, bee-openings $a$, cleats $e$, and honey-frames C, provided with pins $c'$ on their opposite ends, resting on said cleats, substantially as described, and for the purpose set forth.

In testimony that we claim the above as our invention we hereunto set our hands this 12th day of August, 1879.

EZRA SHEFFIELD.
GEORGE R. BARNES.

In presence of—
J. A. SHEFFIELD,
GEORGE BERRY.